United States Patent
Su (10) Patent No.: US 7,565,719 B2
(45) Date of Patent: *Jul. 28, 2009

(54) HINGE FOR ANCHORING AND FOLDING ON A SMALL PINTLE

(75) Inventor: Ding-Hone Su, Taipei County (TW)

(73) Assignee: Sinher Technology Inc., Taipei County (TW)

( * ) Notice: Subject to any disclaimer, the term of this patent is extended or adjusted under 35 U.S.C. 154(b) by 478 days.

This patent is subject to a terminal disclaimer.

(21) Appl. No.: 11/409,957

(22) Filed: Apr. 25, 2006

(65) Prior Publication Data

US 2006/0185126 A1    Aug. 24, 2006

Related U.S. Application Data (63) Continuation-in-part of application No. 10/870,042, filed on Jun. 18, 2004, now Pat. No. 7,082,642.

(51) Int. Cl.
E05D 11/08    (2006.01)
(52) U.S. Cl. .......................................... 16/337; 16/340
(58) Field of Classification Search ........... 16/337–339, 16/342, 330, 303, 374, 376, 377, 340; 361/680–683, 361/814; 455/90.3, 575.1, 575.3, 575.8; 379/433.12, 433.13; 348/373, 333.01, 333.06, 348/794
See application file for complete search history.

(56) References Cited

U.S. PATENT DOCUMENTS

| | | | |
|---|---|---|---|
| 5,970,819 | A | 10/1999 | Katoh |
| 6,421,878 | B1 | 7/2002 | Kaneko et al. |
| 6,666,422 | B1 | 12/2003 | Lu et al. |
| 6,813,813 | B2 | 11/2004 | Lu et al. |
| 6,862,779 | B1 | 3/2005 | Lu et al. |
| 2003/0221288 | A1 | 12/2003 | Kim et al. |
| 2004/0025299 | A1 | 2/2004 | Higano et al. |
| 2004/0074050 | A1 | 4/2004 | Birtley |
| 2004/0093690 | A1 | 5/2004 | Lu et al. |

(Continued)

FOREIGN PATENT DOCUMENTS

JP    2001012451 A  *  1/2001

(Continued)

Primary Examiner—Chuck Y. Mah
(74) Attorney, Agent, or Firm—Muncy, Geissler, Olds & Lowe, PLLC (57) ABSTRACT

A hinge for anchoring and folding on a small pintle which has a diameter between 3 and 7.9 mm to form a stepless swiveling and anchoring by increasing the friction resistant force to counter the torque. It includes a maneuvering structure which has a rotary member and an anchor member that form a rotational displacement on a contact surface therebetween that can be swiveled and anchored in a stepless manner and latched on a fixed location for closing. A braking structure is provided that has braking elements and washers to increase the friction resistant forces so that the small pintle has adequate friction resistant forces to anchor a display device after unfolding. The maneuvering structure has anchor elements and retaining troughs of different sizes that cannot be coupled with each other when the display device is unfolded and swiveled to 180 degrees to maintain the original friction resistant forces so that the display device may be anchored at any angle after unfolded.

10 Claims, 14 Drawing Sheets

U.S. PATENT DOCUMENTS

| | | | |
|---|---|---|---|
| 2005/0117284 A1* | 6/2005 | Kida | 361/681 |
| 2005/0155183 A1 | 7/2005 | Lu et al. | |

FOREIGN PATENT DOCUMENTS

| JP | 2001-99133 A | 4/2001 |
|---|---|---|
| JP | 2001-107941 A | 4/2001 |
| JP | 2003-304316 A | 10/2003 |
| JP | 2005-108201 A | 4/2005 |
| JP | 2005-140152 A | 6/2005 |

* cited by examiner

HINGE FOR ANCHORING AND FOLDING ON A SMALL PINTLE

This application is a continuation-in-part, and claims priority, of from U.S. patent application Ser. No. 10/870,042 filed on Jun. 18, 2004 now U.S. Pat. No. 7,082,642, entitled "Hinge for anchoring and folding on a small pintle".

FIELD OF THE INVENTION

The present invention relates to a hinge for anchoring and folding on a small pintle and particularly to a hinge with a pintle diameter in the range of 3 and 7.9 mm for use on notebook computers, PDAs, digital cameras, mobile phones, and the like for swiveling a display device relative to a host body.

BACKGROUND OF THE INVENTION

The display device now being used on electronic devices such as notebook computers, PDAs, digital cameras, mobile phones, and the like generally is coupled on the host body through a hinge. The display device may be unfolded when in use, and be folded on the host body when not in use to reduce the size to facilitate storing and carrying.

Angular adjustment of the display device, notebook computers, small desktop computers or other foot stands generally is accomplished through the pivotal hinge which can be extended and folded in a stepless fashion. After closed, the body has a switch to latch the screen from opening. The hinge also provides a coupling and anchoring movement to generate a torque to close the screen. With constant advances of technologies, the larger CRT display device has been gradually replaced by the smaller flat display device. For instance, the flat LCD device has become a standard feature of the notebook computers and many desktop computers. With the size of the display device becomes smaller and lighter, the hinge also is smaller. The friction resistance between the elements is smaller and cannot provide enough torque to meet the requirements. As a result, the display device cannot be opened and closed in a stepless fashion. During closing, the display device could drop and close abruptly, and the stepless adjustment function is impaired. The display device and the host body could be damaged.

SUMMARY OF THE INVENTION

The primary object of the invention is to provide a hinge adopted for use on notebook computers, PDAs, digital cameras, mobile phones, and the like for swiveling the display device relative to the host body.

The invention has a maneuvering structure that includes a rotary member and an anchor member that have a contact surface therebetween to provide a rotational displacement such that they may be swiveled and anchored in a stepless fashion and to close and latch the screen without a switch. A braking structure is added that includes braking elements and washers to increase the friction resistant force so that even the hinge with a small pintle still can provide steady and stepless anchoring and folding function.

The hinge according to the invention aims at a pintle with the diameter in the range between 3 and 7.9 mm to provide a stepless swiveling and anchoring that has adequate friction resistant force to anchor the display device at a desired angle after unfolded.

Another object of the invention is to provide a maneuvering structure that has anchor elements and retaining troughs of different sizes that cannot be coupled when the display device is unfolded and swiveled to 180 degrees to maintain the original friction resistant force so that the display device is not latched when it is unfolded and swiveled to 180 degrees.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 10A through 11B are schematic views of two other embodiments for fastening the bracing element and fastening dock of the invention.

DETAILED DESCRIPTION OF THE PREFERRED EMBODIMENTS

Figure 1:
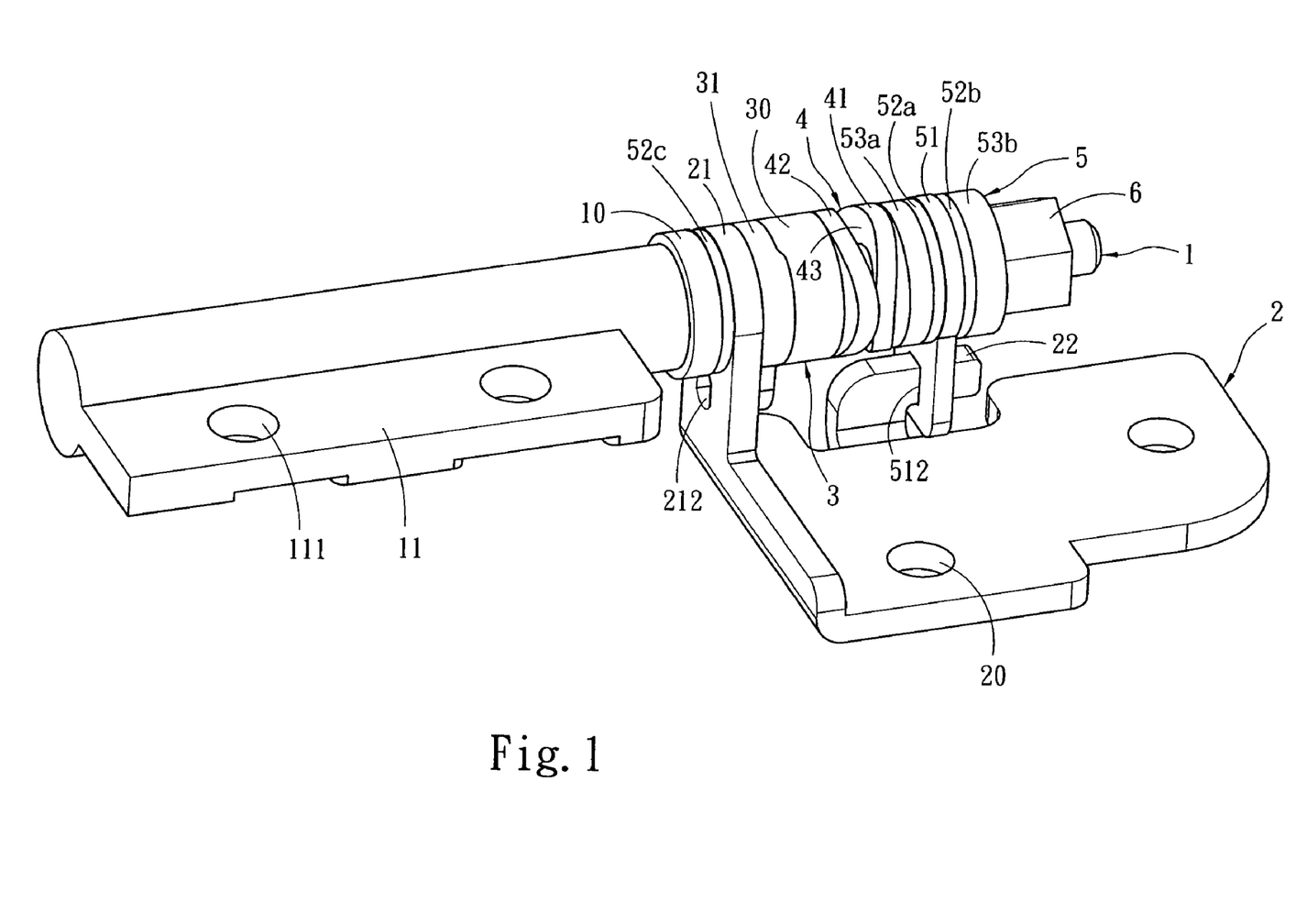
FIG. 1 is a perspective view of the present invention.
Figure 2:
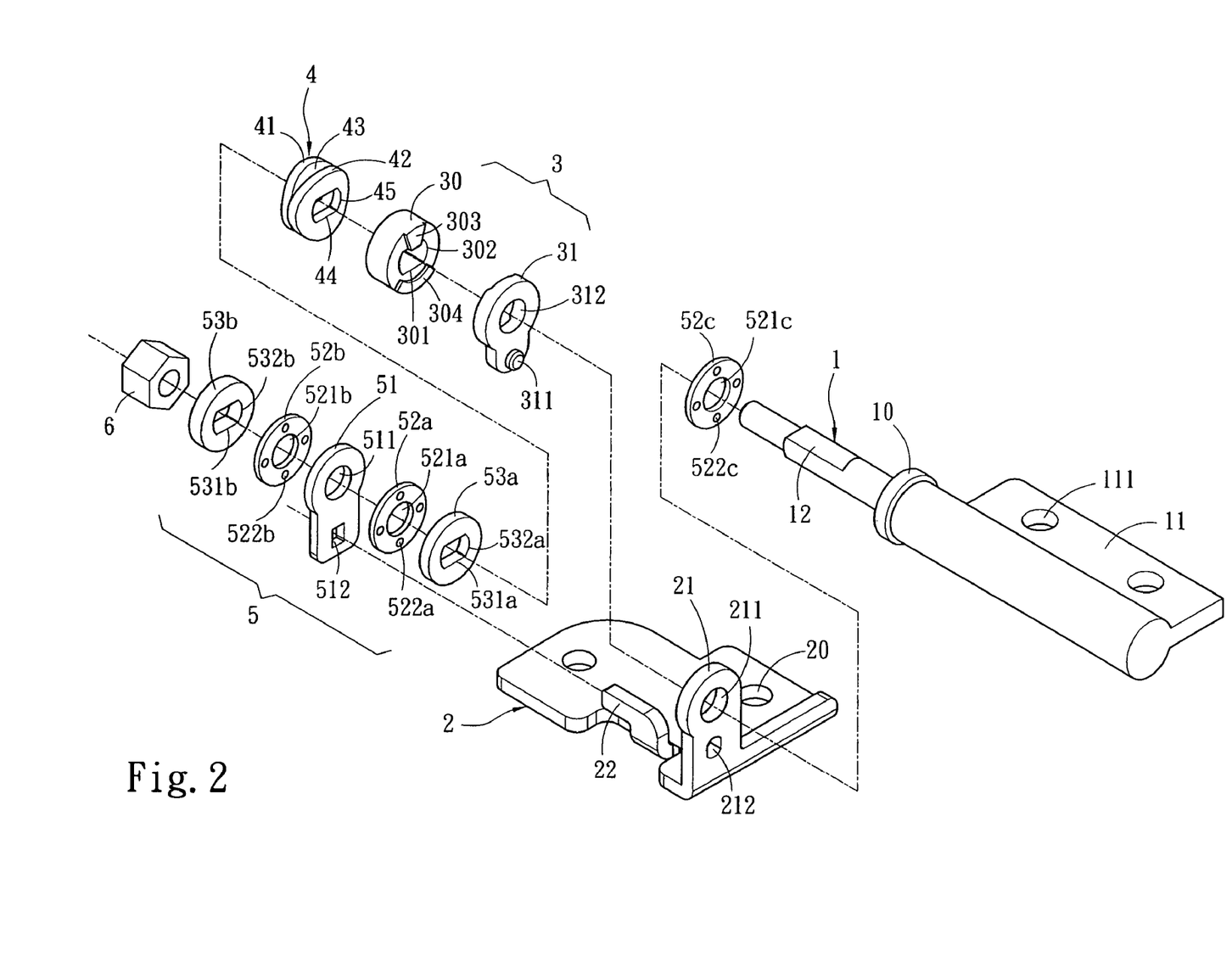
FIG. 2 is an exploded view of the present invention.
Figure 3:
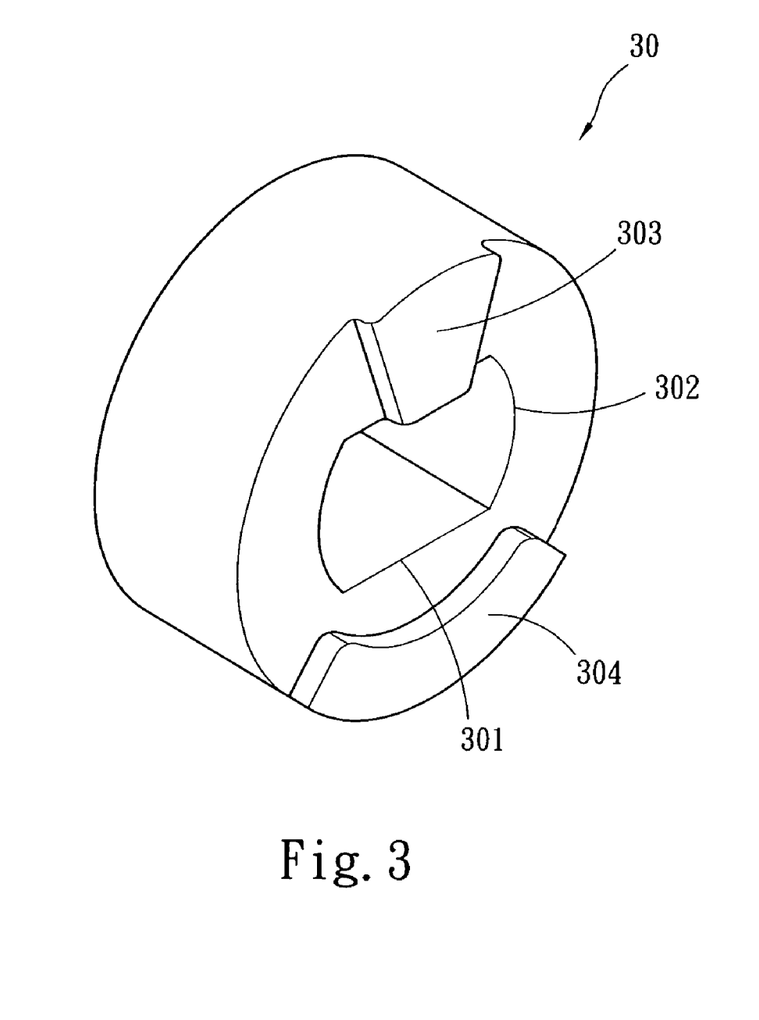
FIG. 3 is a perspective view of the rotary member of the present invention.
Figure 4:
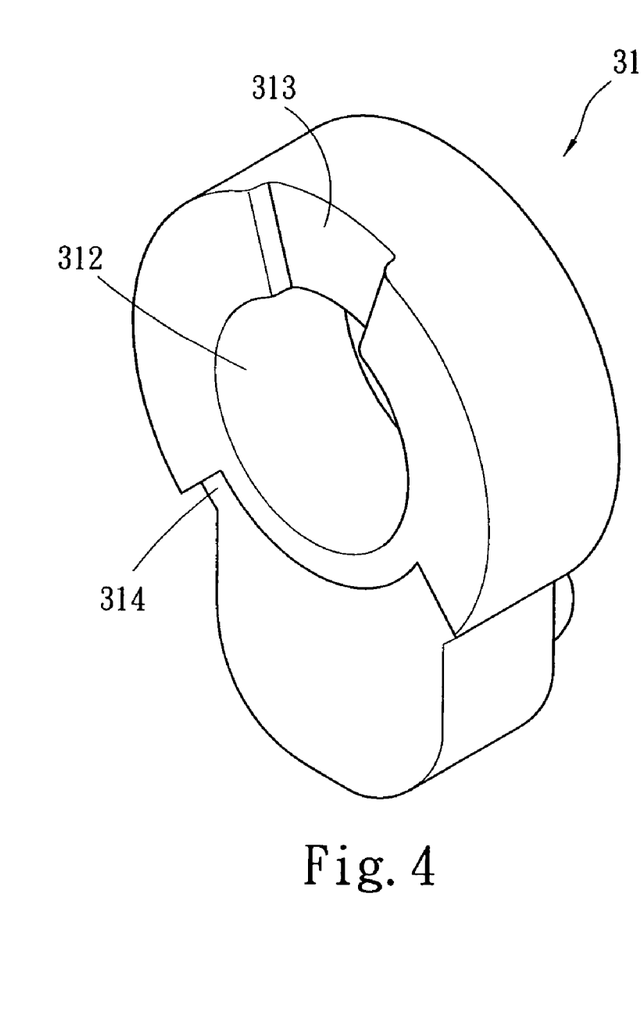
FIG. 4 is a perspective view of the anchor member of the present invention.
Figure 6:
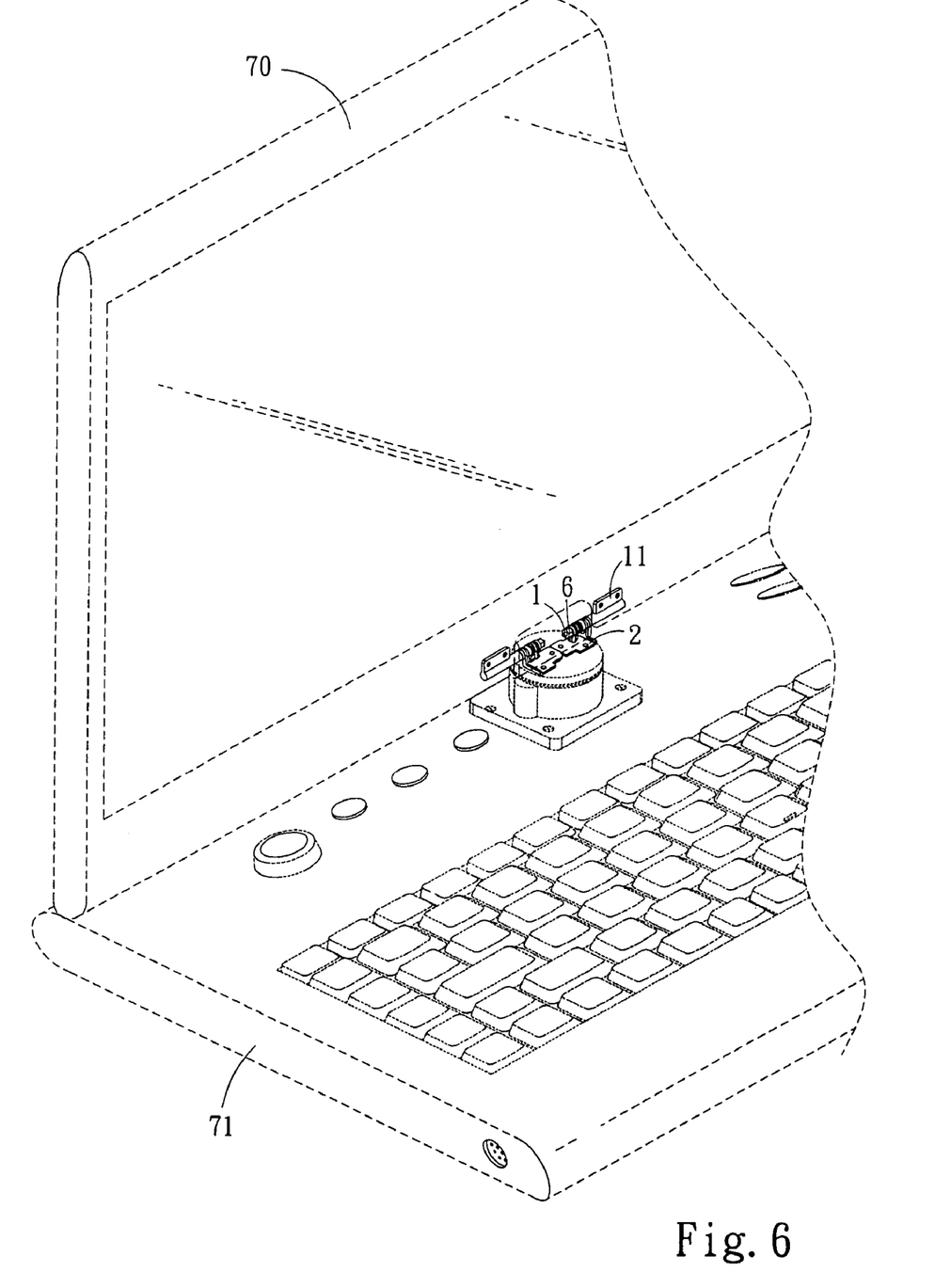
FIG. 6 is a schematic view of the invention in use on a notebook computer.

Please refer to FIGS. 1 and 2, the hinge of the present invention is for anchoring and folding on a small pintle. Referring to FIG. 6 for the invention adopted for use on a notebook computer as an example. It aims to couple a host body 71 and a display device 70. The display device 70 may be swiveled about the pintle of the hinge relative to the host body 71. It may also be applied to other electronic devices such as PDAs, digital cameras and mobile phones and the like that require to swivel the display device 70 relative to the host body 71 for folding and unfolding. The hinge includes:

a pintle 1 having a stopper 10 in the middle. The stopper 10 has one end connecting to a coupling flap 11 which may be swiveled with the pintle 1 and has fastening bores 111 to couple with a load (such as the display device 70). The pintle 1 has other end formed two symmetrical contact surfaces 12 on the periphery by machining. The other end of the pintle 1 is pivotally coupled with a fastening dock 2. The fastening dock 2 has fastening bores 20 to fasten to the host body 71. The fastening dock 2 also has a round opening 211 and a bracing flange 21 with a latch trough 212 formed thereon. The round opening 211 is to receive the pintle 1 to form a pivotal coupling structure. The fastening dock 2 further has a latch finger 22. The stopper 10 and the bracing flange 21 are interposed by a braking element 52c which has a round opening 521c to couple with the pintle 1 so that the braking element 52c is turnable thereon. The braking element 52c has a plurality of oil cavities 522c to store oil to allow the braking element 52c to be sandwiched closely between the stopper 10 and the bracing flange 21 to increase the friction resistant force during swiveling;

a maneuvering structure 3 which includes a rotary member 30 and an anchor member 31 (referring to FIGS. 3 and 4). The anchor member 31 has a lug 311 on one side to latch on the latch trough 212 of the fastening dock 2 and a round opening 312 to receive the pintle 1. Hence the anchor member 31 is fixedly coupled on the fastening dock 2 without turning. The rotary member 30 has a round opening 302 in the center that has two flat surfaces 301 corresponding to the contact surfaces 12 of the pintle 1. Hence the rotary member 30 is turnable with the pintle 1. The rotary member 30 and the anchor member 31 form a rotary displacement on a contact surface formed therebetween. The rotary member 30 has a first anchor element 303 and a second anchor element 304 on the contact surface. The surface of the first anchor element 303 is smaller than that of the second anchor element 304. The anchor member 31 has a first retaining trough 313 and a second retaining trough 314 on the contact surface corresponding respectively to the first anchor element 303 and the second anchor element 304. Therefore the rotary member 30 and the anchor member 31 may be coupled and latched only when the first anchor element 303 and the second anchor element 304 are wedged in the first retaining trough 313 and the second retaining trough 314 in the rotational displacement of 360 degrees on the contact surface;

a returning element 4 abutting one side of the maneuvering structure 3. The returning element 4 is flexible and elastic, and has two symmetrical wings 41 and 42 on two sides interposed by a wedge notch 43. It has an aperture opening 45 in the center with two flat surfaces 44 corresponding to the contact surfaces 12 of the pintle 1. Hence it is also turnable with the pintle 1. It is mounted on the pintle 1 and compressed when assembled, and releases the pressure when the rotary member 30 and the anchor member 31 are latched; and a braking structure 5 abutting the retaining element 4 that includes a bracing element 51 which has a round opening 511 and a latch trough 512 to couple with the latch finger 22 of the fastening dock 2. The bracing element 51 is sandwiched between two braking elements 52a and 52b, and two washers 53a and 53b which have respectively an aperture 532a and 532b with flat surfaces 531a and 531b to couple with the pintle 1 and are turnable therewith. The braking elements 52a and 52b have respectively a round opening 521a and 521b in the center to receive the pintle 1 but are not turnable therewith. The braking elements 52a and 52b further have a plurality of oil cavities 522a and 522b to store oil so that the braking elements 52a and 52b may be in contact with and sandwiched between the washers 53a and 53b and the bracing element 51 to increase the friction resistant force. Finally the pintle 1 is engaged with a nut 6 to complete assembly of the hinge.

Figure 5A:
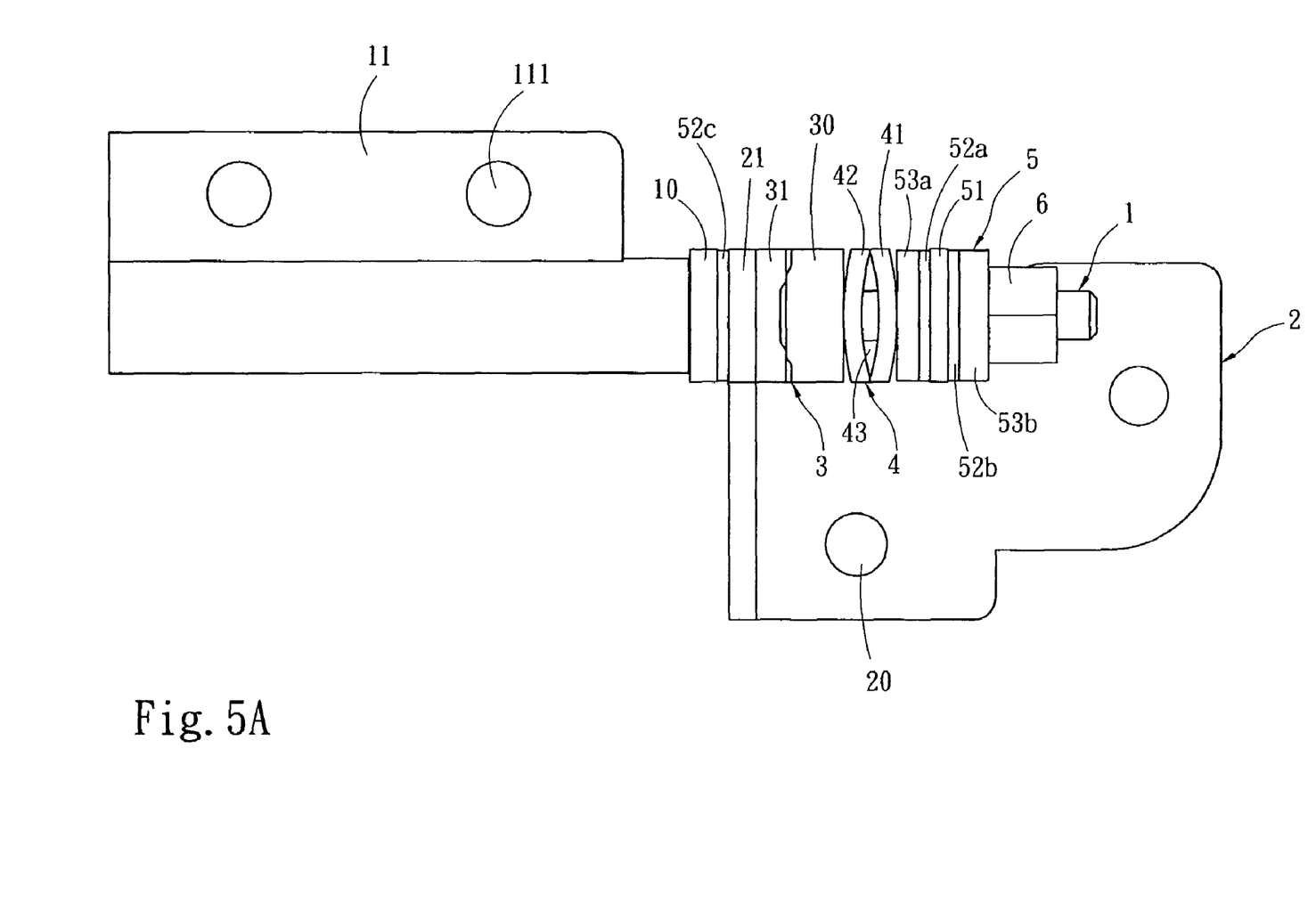
FIG. 5A is a top view of the present invention with the hinge unfolded at 180 degrees.
Figure 7A:
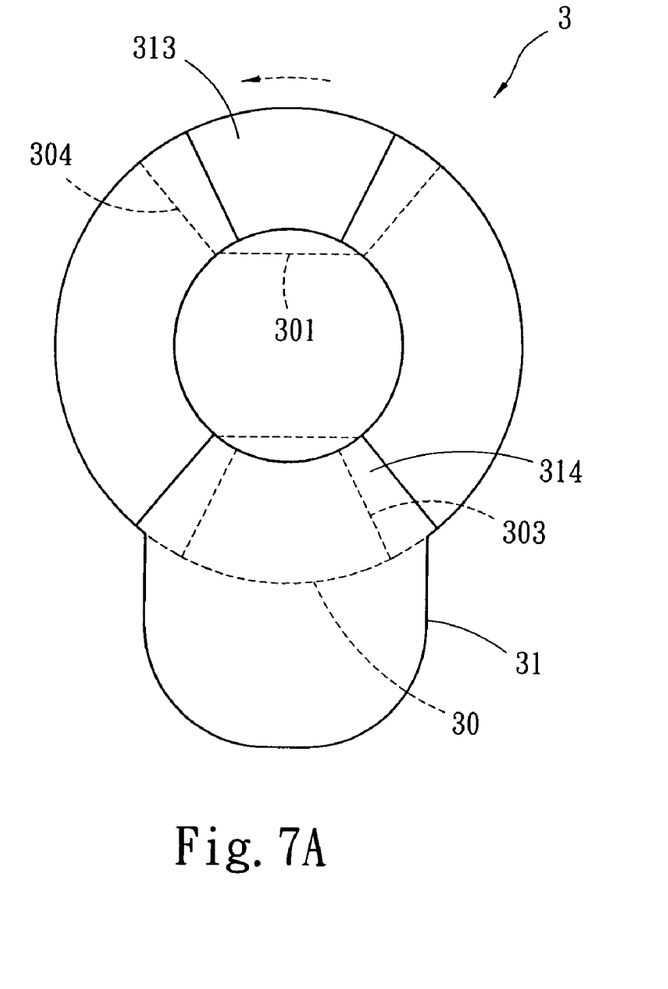
FIG. 7A is a schematic view of the invention showing the positional relationship of the rotary member and the anchor member when the hinge unfolded at 180 degrees.

Referring to FIGS. 5A, 5B, 5C and 6 for the invention adopted for use on a notebook computer 7. As the signal line of the display device 70 cannot be twisted, the rotational displacement of the display device must be smaller than 360 degrees (the embodiment has the displacement of 180 degrees; in practice any angle smaller than 360 degrees is acceptable). The display device 70 may be swiveled for unfolding or closing in a stepless fashion. When the display device 70 is unfolded, and the display device 70 and the host body 71 are extended at 180 degrees (as shown in FIG. 5A), the display device 70 still is in an anchor condition without dropping heavily on the desktop. This is because the rotary member 30 and the anchor member 31 are not in the latch condition, and the first anchor element 303 and the second anchor element 304 of the rotary member 30 and the first retaining trough 313 and the second retaining trough 314 of the anchor member 31 are not coupled and latched (referring to FIG. 7A) due to their different sizes. When the display device 70 and the host body 71 are swiveled to an angle about 0 degree to a closed condition, the resistant force between the rotary member 30 and the anchor member 31 is absent and the torque is fully released. When the display device 70 and the host body 71 are unfolded about 180 degrees, the first anchor element 303 and the second anchor element 304 of the rotary member 30 are turned and moved to opposite locations, hence the larger first anchor element 303 faces the smaller retaining trough 314, as a result, the rotary member 30 and the anchor member 31 are not coupled. Thus the returning element 4 continuously compresses the braking structure 5, and the display device 70 may be unfolded at any angle, and the rotary member 30 and the anchor member 31 still maintain a not coupling condition. The rotary member 30 compresses the returning element 4 on one side to store energy and increase the friction resistant force through the contact areas of the braking structure 5. And the braking elements 52a and 52b form a compressed contact with the washers 53a and 53, or the bracing element 51. The contact areas of the braking elements 52a and 52b also increase. Hence the friction resistant force is greater than the torque resulting from the weight of the display device 70. As a result, the display device 70 may be anchored in a stepless fashion.

Figure 5B:
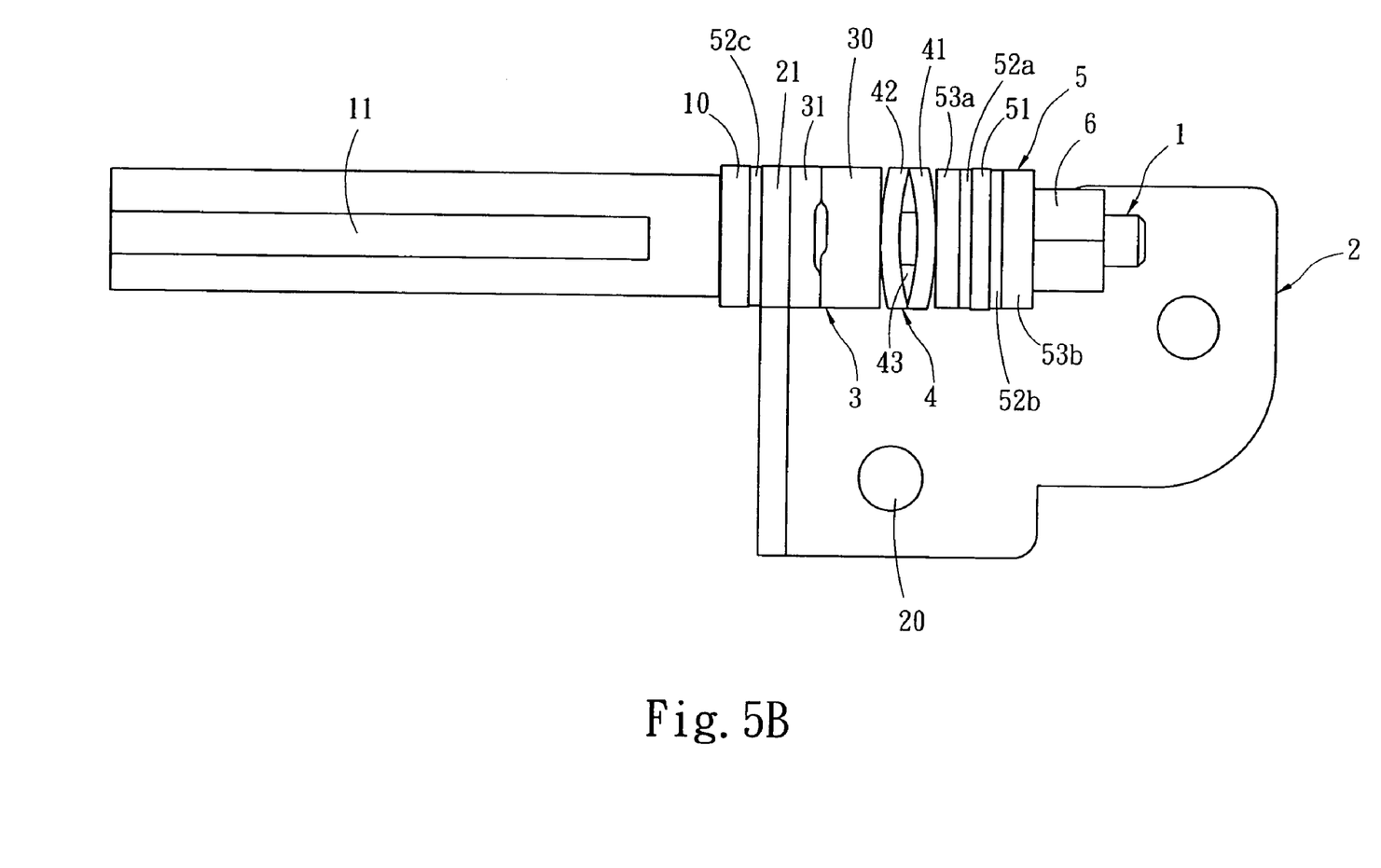
FIG. 5B is a top view of the present invention with the hinge unfolded at 90 degrees.
Figure 5C:
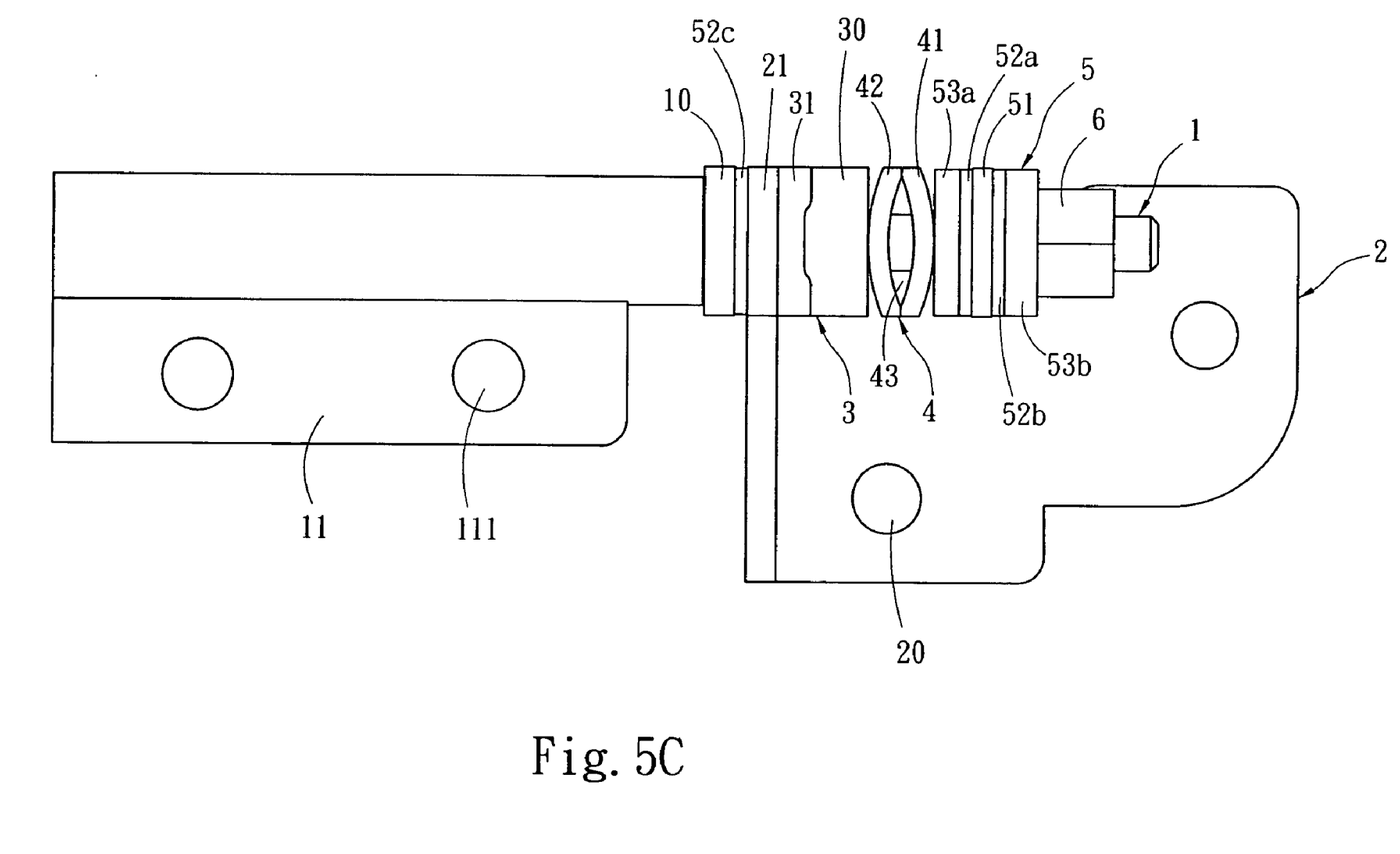
FIG. 5C is a top view of the present invention with the hinge folded at 0 degree.
Figure 7B:
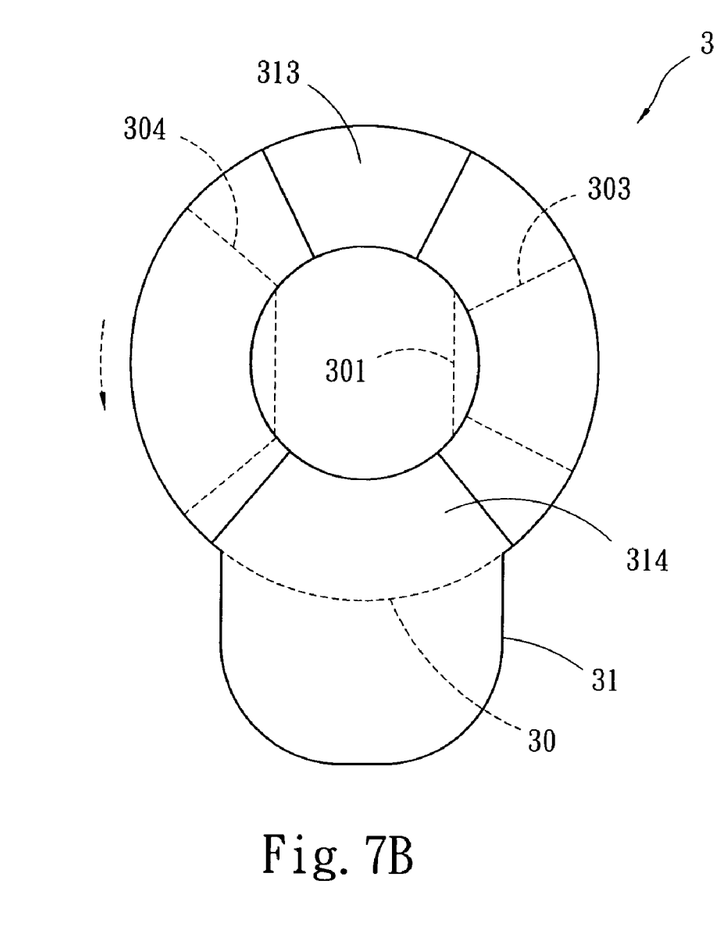
FIG. 7B is a schematic view of the invention showing the positional relationship of the rotary member and the anchor member when the hinge unfolded at 90 degrees.

Referring to FIG. 5B, when the display device 70 and the host body 71 are unfolded at 90 degrees, the rotary member 30 and the anchor member 31 are still not latched. The first anchor element 303 and the second anchor element 304 of the rotary member 30 and the first retaining trough 313 and the second retaining trough 314 of the anchor member 31 are not coupled and latched (referring to FIG. 7B). When the display device 70 and the host body 71 are unfolded at 90 degrees, the first anchor element 303 and the second anchor element 304 are moved, but only touch the wall surfaces of the first retaining trough 313 and the second retaining trough 314, hence the rotary member 30 and the anchor member 31 are not coupled. Meanwhile the friction resistant force on the contact surface increases due to the braking structure 5, and the braking elements 52a and 52b form a compressed contact with the washers 53a and 53, or the bracing element 51. The friction resistant force is greater than the torque resulting from the weight of the display device 70. As a result, the display device 70 may be anchored at any inclined angle.

Figure 7C:
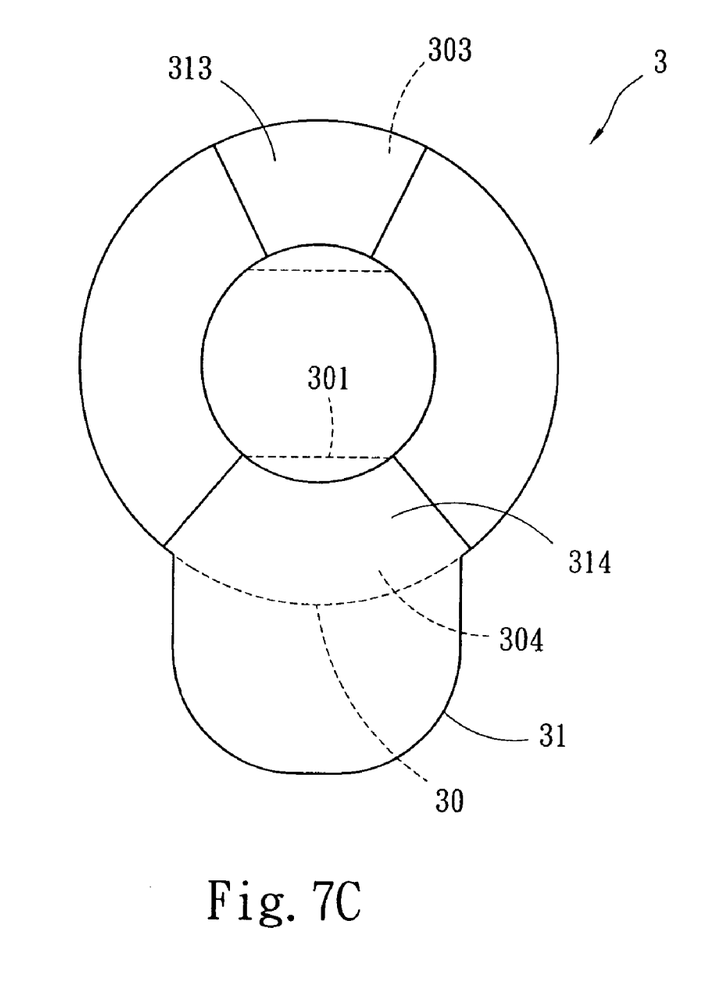
FIG. 7C is a schematic view of the invention showing the positional relationship of the rotary member and the anchor member when the hinge folded at 0 degree.

To fold and close the display device 70 (referring to FIG. 5C), the invention provides a returning design. As the rotary member 30 and the anchor member 31 are not latched originally, when the pintle 1 rotates to move the larger first anchor element 303 and the smaller second anchor element 304 to couple on the larger first retaining trough 313 and the smaller second retaining trough 314 (referring to FIG. 7C), the display device 70 is folded onto the host body 71 to form an angle about 0 degree. The resistant force between the rotary member 30 and the anchor member 31 is absent and the torque is fully released. Hence when the display device 70 and the host body 71 are closed at 0 degree, the larger first anchor element 303 and the smaller second anchor element 304 are moved to couple with the larger first retaining trough 313 and the smaller second retaining trough 314. The interval between the rotary member 30 and the anchor member 31 is shrunk. The original compressed elastic force of the returning element 4 is released. The pintle 1 may be turned in reverse to drive the display device 70 to close automatically.

Figure 8:
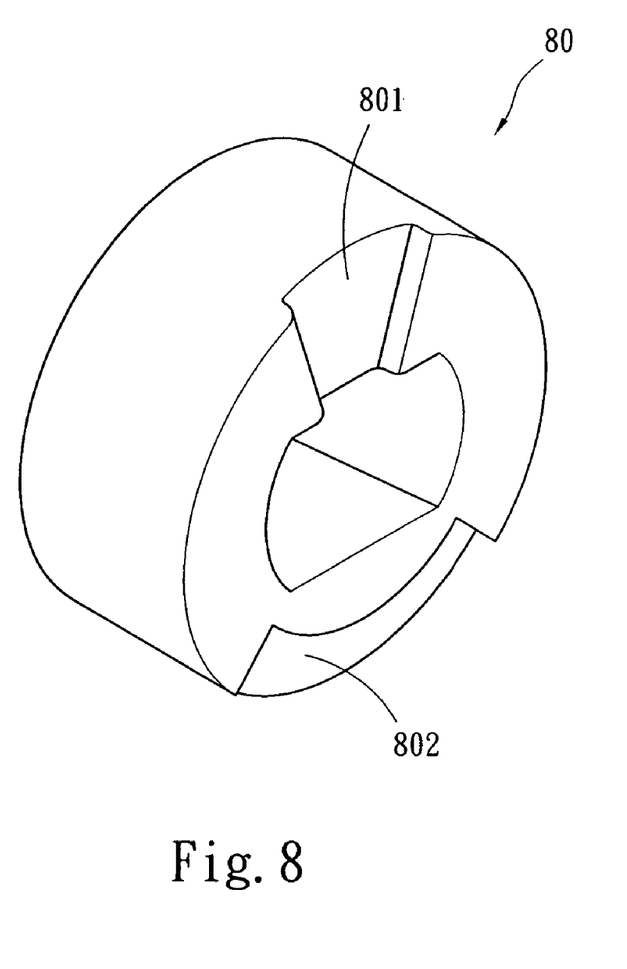
FIG. 8 is a perspective view of another embodiment of the rotary member of the invention.
Figure 9:
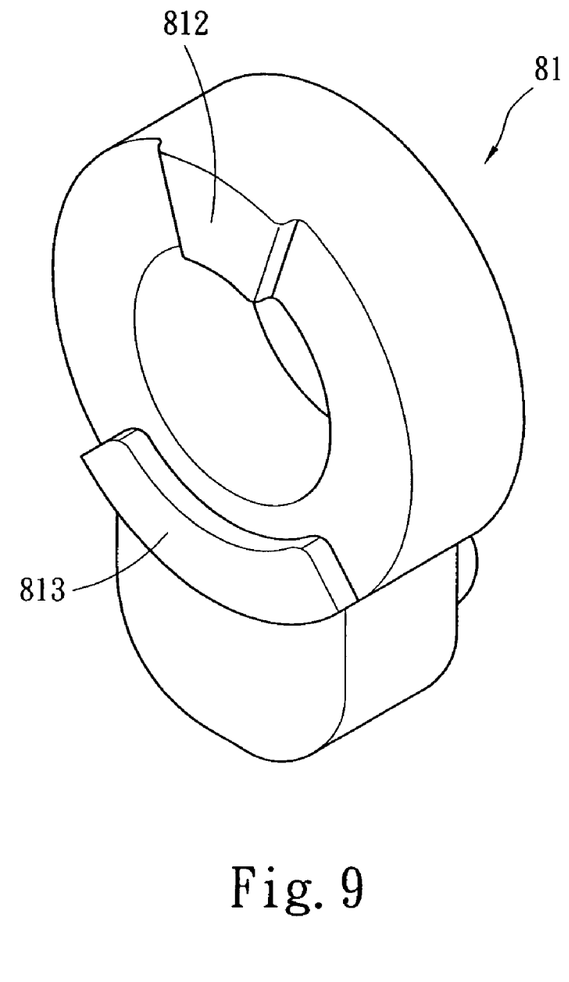
FIG. 9 is a perspective view of another embodiment of the anchor member of the invention.
Figure 10A:
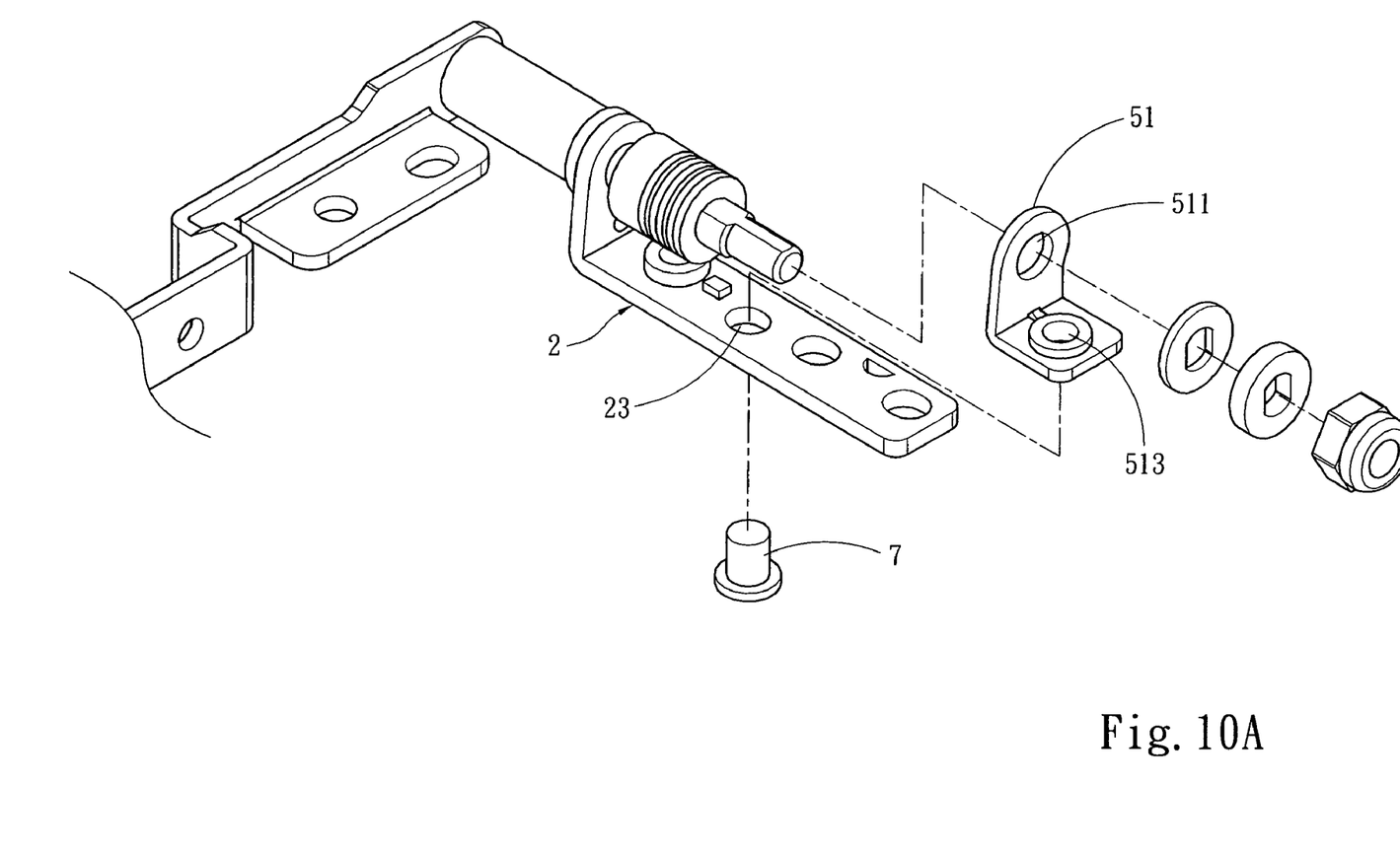
Figure 10B:
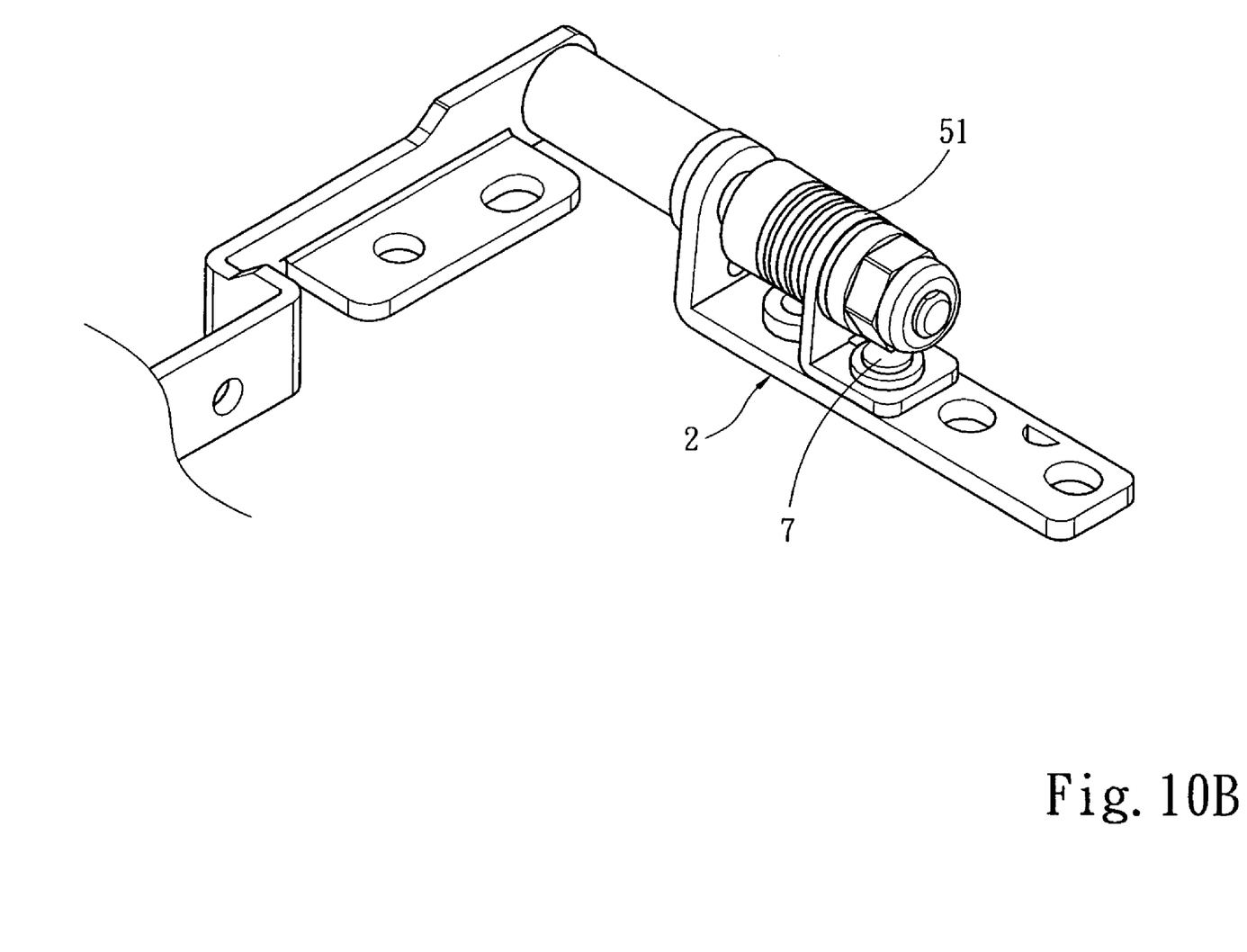

Referring to FIGS. 8 and 9 for another embodiment of the rotary member 80 and the anchor member 81. They form a rotational displacement on the contact surface therebetween. The rotary member 80 has a small first retaining trough 801 and a large second retaining trough 802 on the contact surface. The anchor member 81 has a first anchor element 811 and a second anchor element 812 on the contact surface corresponding to the first retaining trough 801 and the second retaining trough 802. Therefore the rotary member 80 and the anchor member 81 form a rotational displacement in 360 degrees. Only when the first anchor element 811 is moved to the first retaining trough 801 and the second anchor element 812 is moved to the second retaining trough 802, can the rotary member 80 and the anchor member 81 be coupled and latched.

Refer to FIGS. 10A through 11B for two other possible approaches for fastening the bracing element and the fastening dock. First referring to FIGS. 10A and 10B, this embodiment is substantially same as the embodiments previously discussed. The difference is that the bracing element 51 and the fastening dock 2 have respectively a through hole 513, 23 that can be fastened together through a rivet 7 by riveting. This approach can achieve a firmer coupling between the bracing element 51 and the fastening dock 2.

Figure 11A:
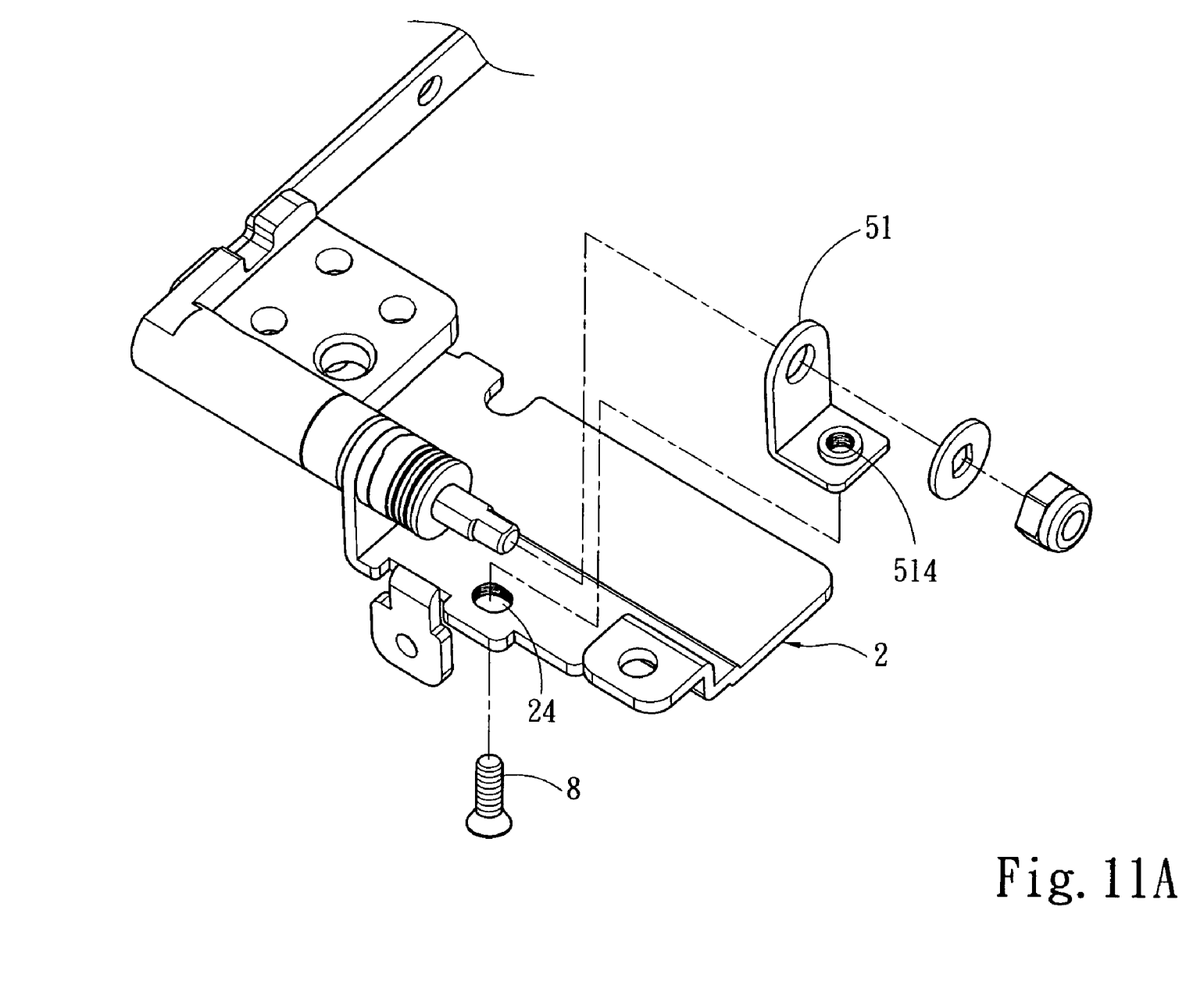
Figure 11B:
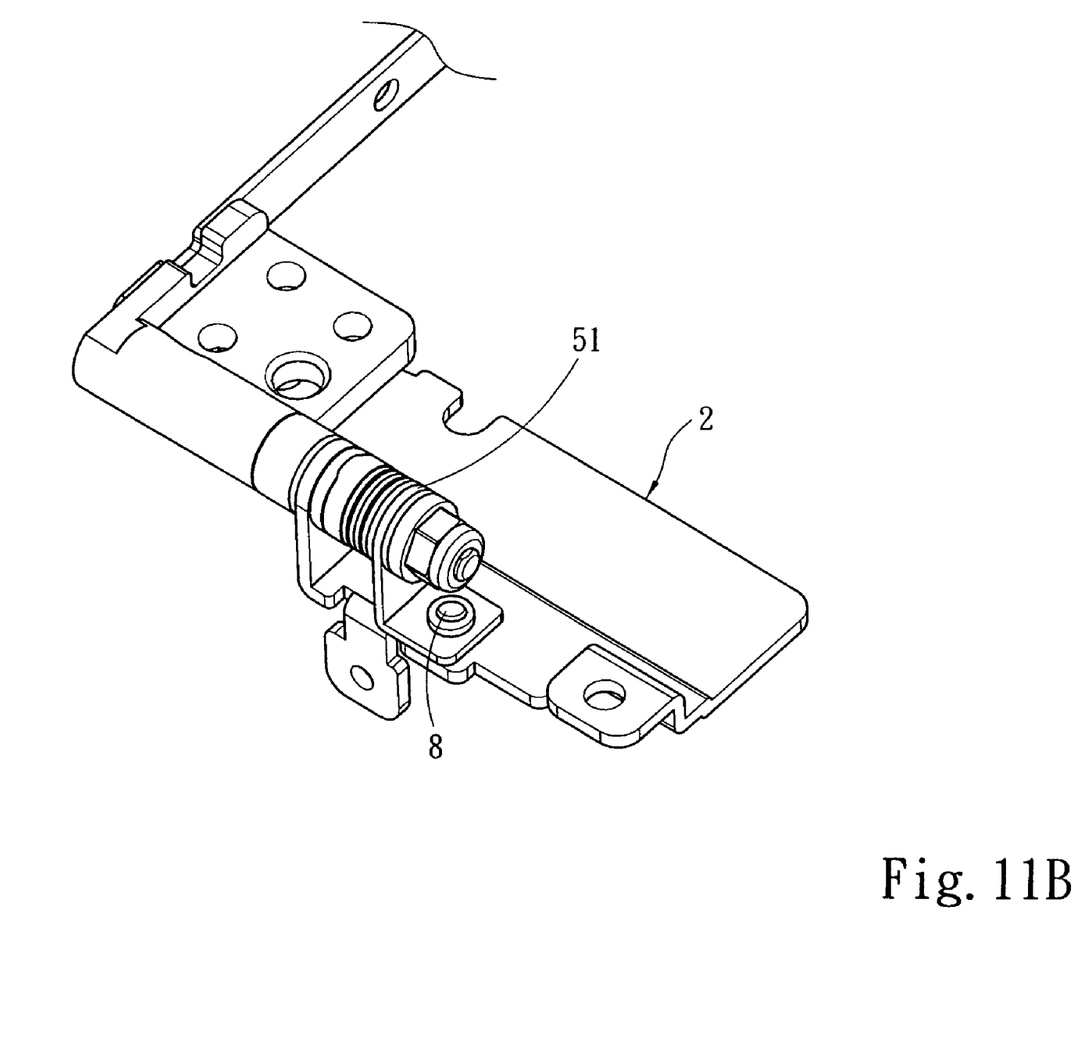

Referring to FIGS. 11A and 11B, in this embodiment the bracing element 51 and the fastening dock 2 have respectively a screw hole 514, 24 that can be fastened together through a screw 8 by screwing. This approach not only can enhance coupling of the bracing member 51 and the fastening dock 2, also provides disassembly function.

In short, fastening of the bracing element 51 and the fastening dock 2 can be achieved by wedging, riveting or screwing.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A hinge for anchoring and folding on a small pintle, comprising a pintle which has one end pivotally coupled with a fastening dock and other end connecting to a coupling flap, the one end of the pintle coupled with the fastening dock further being coupled with a maneuvering structure and a braking structure and a returning element interposed between the maneuvering structure and the braking structure, wherein:

the maneuvering structure includes a rotary member and an anchor member that have a contact surface therebetween to form a rotational displacement which allows the rotary member and the anchor member to swivel and anchor as desired and latch on a selected location, the braking structure including a bracing element, a plurality of braking elements and washers to increase friction resistant forces between the braking elements and the washers, the bracing element being sandwiched tightly between two of the braking elements, and the bracing element and the fastening dock having respectively a through hole to receive a rivet for riveting together.

2. The hinge of claim 1, wherein the contact surface of the rotary member has a first anchor element and a second anchor element that have different areas.

3. The hinge of claim 2, wherein the contact surface of the anchor member has a first retaining trough corresponding to the first anchor element and a second retaining trough corresponding to the second anchor element.

4. The hinge of claim 1, wherein the braking elements have respectively a plurality of oil cavities.

5. The hinge of claim 1, wherein the washers are turnable with the pintle, and the braking elements are not turnable with the pintle.

6. A hinge for anchoring and folding on a small pintle, comprising a pintle which has one end pivotally coupled with a fastening dock and other end connecting to a coupling flap, the one end of the pintle coupled with the fastening dock further being coupled with a maneuvering structure and a braking structure and a returning element interposed between the maneuvering structure and the braking structure, wherein:

the maneuvering structure includes a rotary member and an anchor member that have a contact surface therebetween to form a rotational displacement which allows the rotary member and the anchor member to swivel and anchor as desired and latch on a selected location, the braking structure including a bracing element, a plurality of braking elements and washers to increase friction resistant forces between the braking elements and the washers, the bracing element being sandwiched tightly between two of the braking elements, the bracing element and the fastening dock having respectively a screw hole to receive a screw for screwing together.

7. The hinge of claim 6, wherein the contact surface of the rotary member has a first anchor element and a second anchor element that have different areas.

8. The hinge of claim 7, wherein the contact surface of the anchor member has a first retaining trough corresponding to the first anchor element and a second retaining trough corresponding to the second anchor element.

9. The hinge of claim 6, wherein the braking elements have respectively a plurality of oil cavities.

10. The hinge of claim 6, wherein the washers are turnable with the pintle, and the braking elements are not turnable with the pintle.

* * * * *